Patented Apr. 9, 1940

2,196,757

UNITED STATES PATENT OFFICE 2,196,757

AZO COMPOUNDS AND PROCESS FOR COLORING THEREWITH

Joseph B. Dickey, Rochester, N. Y., assignor to Eastman Kodak Company, Rochester, N. Y., a corporation of New Jersey No Drawing. Application December 22, 1938, Serial No. 247,284

8 Claims. (Cl. 260—165)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo compounds of my invention have the general formula:

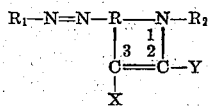

wherein $R_1$ represents the residue of an aromatic nucleus, R represents the residue of a phenyl nucleus, $R_2$ represents a member selected from the group consisting of an alkyl group, a cycloalkyl group, an aryl group, an aralkyl group and a heterocyclic group, X and Y each represents a member selected from the group consisting of hydrogen, an alkyl group, a cycloalkyl group, an aryl group, an aralkyl group and a heterocyclic group and wherein the nitrogen atom in the position numbered 1 is joined to the carbon atom of said phenyl nucleus R which is in para position to the azo bond and the carbon atom in the position numbered 3 is joined to the carbon atom of said phenyl nucleus R which is in meta position to the azo bond. It will be understood that the phenyl nucleus designated R may contain substituents and, accordingly, R, as used in the specification and claims, includes an unsubstituted phenyl residue as well as a substituted phenyl residue. The phenyl residue R may be substituted, for example, with a nitro group, a halogen atom, an alkyl group or an alkoxy group but in naming these substituents it will be understood that they are illustrative and not limitative.

It will be understood that alkyl, as used herein, unless otherwise stated, includes not only unsubstituted alkyl groups, such as a methyl group, an ethyl group or a propyl group but also substituted alkyl groups such as β-hydroxyethyl, β, γ-hydroxypropyl, β-methoxyethyl or β-ethoxyethyl, for example. Illustrative of halogen may be mentioned chlorine, bromine and iodine. Similarly, illustrative alkoxy groups include methoxy, ethoxy and propoxy. Illustrative of cycloalkyl and aralkyl may be mentioned cyclohexyl and benzyl respectively.

The azo dye compounds of my invention can be prepared by diazotizing a primary aromatic amine and coupling the diazonium compound obtained with a coupling compound having the general formula:

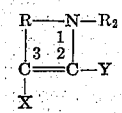

wherein R, $R_2$, X and Y have the meaning previously assigned to them. No substituent which would prevent coupling should be present. To illustrate, no substituent should be present in the position in which coupling would otherwise occur.

As previously indicated, the nuclear non-sulfonated aromatic azo dye compounds of my invention constitute valuable dyes for the coloration of organic derivatives of cellulose such as those hereinbefore mentioned, yielding various shades thereon of good fastness to light and washing. These nuclear non-sulfonated dye compounds, likewise, possess application for the dyeing of wool and silk and yield generally similar shades on these materials as on organic derivatives of cellulose. Compounds in which the aromatic nucleus, designated $R_1$, contains a nuclear sulfonic acid group can likewise be prepared in known fashion. These compounds possess little or no utility for the coloration of organic derivatives of cellulose but can be employed to color textile materials such as wool and silk yielding various shades thereon. For the dyeing of organic derivatives of cellulose, such as cellulose acetate silk, nuclear non-sulfonated compounds, wherein $R_1$ is a phenyl residue, are generally advantageous. Said phenyl residue may be substituted as clearly shown herein.

The following examples illustrate the preparation of the azo dye compounds of my invention:

Example 1

12.6 grams of o-chloroaniline are added to 150 cc. of water to which has been added 25 cc. of 36% hydrochloric acid. The resulting solution is cooled to a temperature approximating 0–5° C. by the addition of ice, for example, and the o-chloroaniline is diazotized while maintaining this temperature by adding, with stirring, 6.9 grams of sodium nitrite dissolved in water.

17.5 grams of 1,4-dimethyl-7-methoxyindole are dissolved in dilute hydrochloric acid. The resulting solution is cooled to a temperature approximating 0–10° C. by the addition of ice, for example, and the diazonium compound prepared as described above is slowly added with stirring. The mixture is then permitted to stand for a while after which it is slowly made neutral to Congo red paper by the addition of sodium bicarbonate. Upon completion of the coupling reaction which takes place and which is carried out while maintaining a temperature of 0–10° C., the dye compound formed is recovered by filtration, washed with water and dried. The dye compound obtained colors cellulose acetate silk, wool and silk a yellow shade.

Example 2

13.5 grams of p-aminoacetophenone are diazotized in accordance with the method described in Example 1 and the diazonium compound obtained is coupled with 14.5 grams of 1,3-dimethyl indole. The coupling reaction and recovery of the dye compound may be carried out as described in Example 1. The dye compound obtained colors cellulose acetate silk, wool and silk a yellowish-orange shade.

Example 3

13.8 grams of p-nitroaniline are diazotized in accordance with the general method described in Example 1 and the diazonium compound obtained is coupled with 17.5 grams of 1-beta-hydroxyethyl-3-methyl indole. The coupling reaction and recovery of the dye compound may be carried out as described in Example 1. The dye compound obtained colors cellulose acetate silk, wool and silk a red shade.

Example 4

16.3 grams of p-nitro-o-chloroaniline are diazotized in accordance with the general method described in Example 1 and the diazonium compound obtained is coupled with 17.7 grams of 1-beta-hydroxyethyl-6-methyl indole. The coupling reaction and recovery of the dye compound may be carried out as described in Example 1. The dye compound obtained colors cellulose acetate silk, wool and silk a rubine shade.

Example 5

21.7 grams of p-nitro-o-bromoaniline are diazotized in accordance with the general method described in Example 1 and the diazonium compound obtained is coupled with 22.3 grams of 1-glyceryl-6-methoxy indole. The coupling reaction and recovery of the dye compound may be carried out as described in Example 1. The dye compound obtained colors cellulose acetate silk, wool and silk a rubine shade.

Example 6

26.4 grams of p-nitro-o-iodoaniline are diazotized in accordance with the general method described in Example 1 and the diazonium compound obtained is coupled with 25 grams of 1-glyceryl-3,4-dimethyl-7-methoxy indole. The coupling reaction and recovery of the dye compound may be carried out as described in Example 1. The dye compound obtained colors cellulose acetate silk, wool and silk a violet shade.

Example 7

15.6 grams of p-nitro-o-fluoroaniline are diazotized in accordance with the general method described in Example 1 and the diazonium compound obtained is coupled with 26.3 grams of

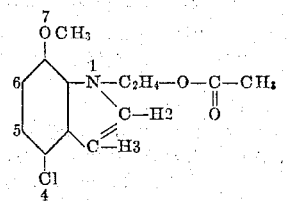

The coupling reaction and recovery of the dye compound may be carried out as described in Example 1. The dye compound obtained colors cellulose acetate silk, wool and silk a red shade.

Example 8

18.3 grams of 2,4-dinitroaniline are diazotized in known fashion and the diazonium compound obtained is coupled with 33.5 grams of 1-sodium-beta-sulphoethyl-4,7-dimethoxy indole. The coupling reaction may be carried out in accordance with the general method described in Example 1. The dye compound formed may be precipitated by the addition of sodium chloride following which it is recovered by filtration, washed with water and dried. The dye compound obtained colors cellulose acetate silk, wool and silk a violet shade.

Example 9

21.7 grams of 2,4-dinitro-6-chloroaniline are diazotized in known fashion and the diazonium compound obtained is coupled with 0.1 gram mole of

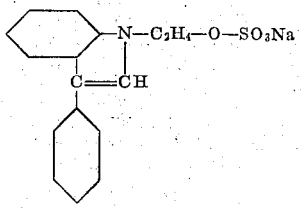

The coupling reaction and recovery of the dye compound may be carried out as described in Example 1. The dye compound obtained colors cellulose acetate silk, wool and silk a violet shade.

Example 10

26.2 grams of 2,4-dinitro-6-bromoaniline are diazotized in known fashion and the diazonium compound obtained is coupled with 0.1 gram mole of

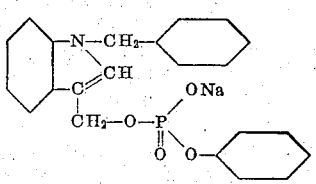

The coupling reaction and recovery of the dye compound may be carried out as described in Example 1. The dye compound obtained colors cellulose acetate silk, wool and silk a violet shade.

*Example 11*

18.6 grams of 5-nitro-2-aminobenzene sulphonic acid are diazotized in known fashion and the diazonium compound obtained is coupled with 37 grams of 1-cetyl-2,3-dimethyl indole. The coupling reaction and recovery of the dye compound may be carried out as described in Example 1. The dye compound obtained colors wool and silk a red shade.

*Example 12*

19.7 grams of p-aminoazobenzene are diazotized in known fashion and the diazonium compound obtained is coupled with 11.7 grams of indole. The coupling reaction and recovery of the dye compound may be carried out as described in Example 1. The dye compound obtained colors cellulose acetate silk, wool and silk an orange shade.

The following tabulation further illustrates the compounds employed in the process of my invention together with the color they produce on cellulose acetate silk. The compounds indicated below may be prepared by diazotizing the amines listed under the heading "Amine" and coupling the diazonium compounds obtained with the compounds specified in the column entitled "Coupling Component". The diazotization and coupling reactions may, for example, be carried out following the general procedure described in Examples 1 to 12 inclusive.

may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of my invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey U. S. Letters Patent No. 2,115,030, issued April 26, 1938. For a more detailed description as to how the water soluble azo dyes of my invention may be employed for the coloration of textile materials made of or containing organic derivatives of cellulose, silk and wool or mixtures of these, reference may be had to McNally and Dickey U. S. Letters Patent No. 2,107,898, issued February 8, 1938.

The coupling components employed in the preparation of the azo dye compounds of my invention may be prepared in accordance with

| Amine | Coupling component | Color on cellulose acetate silk |
|---|---|---|
| o-Chloroaniline | 1. 1-methyl indole | Yellow. |
|  | 2. 1,3-dimethyl indole | Do. |
|  | 3. 1-β-hydroxyethyl-2,3-dimethyl indole | Do. |
|  | 4. 1-β-hydroxyethyl-3-methyl indole | Do. |
|  | 5. 1-glyceryl-3-methyl indole | Do. |
|  | 6. 1-β-acetoxyethyl-3-methyl indole | Do. |
|  | 7. 1-β-sulfatoethyl-3-butyl indole | Do. |
|  | 8. 1-β-sulfoethyl-3-amyl indole | Do. |
|  | 9. 1-($C_2H_4$-O-$C_2H_4$OH)-3-methyl indole | Do. |
|  | 10. 1,6-dimethyl indole | Do. |
|  | 11. 1,3,6-trimethyl indole | Do. |
|  | 12. 1-glyceryl-3,6-dimethyl indole | Do. |
|  | 13. 1-β-phosphatoethyl-3,6-dimethyl indole | Do. |
|  | 14. 1-methyl-6-methoxy indole | Do. |
|  | 15. 1-ethyl-3-methyl-6-methoxy indole | Do. |
|  | 16. 1-β-hydroxyethyl-3-methyl-6-methoxy indole | Do. |
|  | 17. 1-glyceryl-3-methyl-6-methoxy indole | Do. |
|  | 18. 1-glyceryl-3-cetyl-6-methoxy indole | Do. |
|  | 19. 1,3,4-trimethyl-7-methoxy indole | Do. |
|  | 20. 1-methyl-4-methyl-7-methoxy indole | Do. |
|  | 21. 1-β-hydroxyethyl-4-methyl-7-methoxy indole | Do. |
|  | 22. 1-glyceryl-4-methyl-7-methoxy indole | Do. |
|  | 23. 1-sulfoethyl-4-methyl-7-methoxy indole | Do. |
|  | 24. 1-sulfoethyl-4,7-dimethoxy indole | Do. |
|  | 25. 1-ethyl-3-methyl-4,7-dimethoxy indole | Do. |
|  | 26. 1-glyceryl-3-methyl-4,7-dimethoxy indole | Do. |
|  | 27. 1,3-dimethyl-6-chloro indole | Do. |
|  | 28. 1-β-hydroxyethyl-3-methyl-6-chloro indole | Do. |
|  | 29. 1 - β - hydroxyethyl - 3 - methyl - 4 - methyl - 7-methoxy indole. |  |
| o-Bromoaniline | 1-29 above | Do. |
| o-Iodoaniline | do | Do. |
| o-Fluoroaniline | do | Do. |
| 2-chloro-4-methylaniline | do | Do. |
| 2-bromo-4-ethylaniline | do | Do. |
| 2-chloro-4-methoxyaniline | do | Do. |
| 2-iodo-4-propoxyaniline | do | Do. |
| 2-chloro-5-methoxyaniline | do | Do. |
| 2-bromo-5-ethoxyaniline | do | Do. |
| 1-amino-2,4-dichlorobenzene | do | Do. |
| 1-amino-2, 5-dibromobenzene | do | Do. |
| p-Aminoacetophenone | do | Yellow to orange. |
| p-Nitroaniline | do | Orange-yellow to red. |
| p-Nitro-o-chloraniline | do | Orange to rubine. |
| p-Nitro-o-bromoaniline | do | Do. |
| 1-amino-2, 4-dinitrobenzene | do | Red to wine. |
| 1-amino-2,4-dinitro-6-chlorobenzene | do | Red to violet. |
| 1-amino-2, 4-dinitro-6-bromobenzene | do | Do. |
| o-Nitroaniline | do | Orange-yellow to orange. |
| m-Nitroaniline | do | Yellow. |

The azo dye compounds of my invention are, for the most part, relatively insoluble in water. Those compounds which are insoluble in water any of the methods described in the literature but attention is here directed to the method described in Berichte Der Deutschen Chemischen Gesellschaft, volume 57, pages 1753 and 1754 (1924), wherein the preparation of 1,3-dimethyl indole is set forth.

I claim:

1. Material made of or containing an organic derivative of cellulose colored with a nuclear nonsulfonated azo dye compound having the general formula:

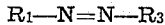

wherein $R_1$ represents the residue of an aryl nucleus of the benzene series and $R_3$ represents the residue of an indole nucleus joined to the azo bond through the carbon atom in its 5 position.

2. A cellulose acetate colored with a nuclear nonsulfonated azo dye compound having the general formula:

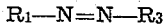

wherein $R_1$ represents the residue of an aryl nucleus of the benzene series and $R_3$ represents the residue of an indole nucleus joined to the azo bond through the carbon atom in its 5 position.

3. Material made of or containing an organic derivative of cellulose colored with a nuclear non-sulfonated azo dye compound having the general formula:

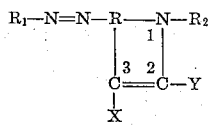

wherein $R_1$ represents the residue of an aryl nucleus of the benzene series, R represents the residue of a phenyl nucleus, $R_2$ represents a member selected from the group consisting of an alkyl group, a cyclohexyl group and a benzyl group, X and Y each represents a member selected from the group consisting of hydrogen, an alkyl group, a cyclohexyl group, a benzyl group and a phenyl group, wherein the nitrogen atom in the position numbered 1 is joined to the carbon atom of said phenyl nucleus R which is in para position to the azo bond and the carbon atom in the position numbered 3 is joined to the carbon atom of said phenyl nucleus R which is in meta position to the azo bond and wherein the phenyl nucleus R is joined to the azo bond through the carbon atom in the position numbered 5.

4. A cellulose acetate colored with a nuclear non-sulfonated azo dye compound having the general formula:

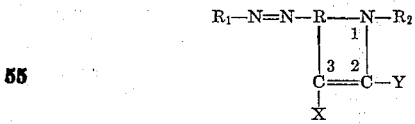

wherein $R_1$ represents the residue of an aryl nucleus of the benzene series, R represents the residue of a phenyl nucleus, $R_2$ represents a member selected from the group consisting of an alkyl group, a cyclohexyl group and a benzyl group, X and Y each represents a member selected from the group consisting of hydrogen, an alkyl group, a cyclohexyl group, a benzyl group and a phenyl group, wherein the nitrogen atom in the position numbered 1 is joined to the carbon atom of said phenyl nucleus R which is in para position to the azo bond and the carbon atom in the position numbered 3 is joined to the carbon atom of said phenyl nucleus R which is in meta position to the azo bond and wherein the phenyl nucleus R is joined to the azo bond through the carbon atom in the position numbered 5.

5. A cellulose acetate colored with a nuclear non-sulfonated azo dye compound having the general formula:

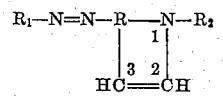

wherein $R_1$ represents the residue of an aryl nucleus of the benzene series, R represents the residue of a phenyl nucleus, $R_2$ represents an alkyl group, wherein each of the hydrogen atoms in the positions numbered 2 and 3 may be replaced by an alkyl group, wherein the nitrogen atom in the position numbered 1 is joined to the carbon atom of said phenyl nucleus R which is in para position to the azo bond and the carbon atom in the position numbered 3 is joined to the carbon atom of said phenyl nucleus R which is in meta position to the azo bond and wherein the phenyl nucleus R is joined to the azo bond through the carbon atom in the 5-position.

6. The monoazo dye compounds having the general formula:

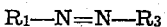

wherein $R_1$ represents the residue of an aryl nucleus of the benzene series containing a nitro group in the para position to the azo bond and $R_3$ represents an indole nucleus containing a hydroxyalkyl group on the nitrogen atom in the 1-position and wherein the nucleus $R_3$ is joined to the azo bond through the carbon atom in the 5-position.

7. Material made of or containing an organic derivative of cellulose colored with a nuclear non-sulfonated monoazo dye compound having the general formula:

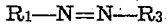

wherein $R_1$ represents the residue of an aryl nucleus of the benzene series containing a nitro group in the para position to the azo bond and $R_3$ represents an indole nucleus containing a hydroxyalkyl group on the nitrogen atom in the 1-position and wherein the nucleus $R_3$ is joined to the azo bond through the carbon atom in the 5-position.

8. A cellulose acetate colored with a nuclear non-sulfonated monoazo dye compound having the general formula:

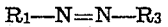

wherein $R_1$ represents the residue of an aryl nucleus of the benzene series containing a nitro group in the para position to the azo bond and $R_3$ represents an indole nucleus containing a hydroxyalkyl group on the nitrogen atom in the 1-position and wherein the nucleus $R_3$ is joined to the azo bond through the carbon atom in the 5-position.

JOSEPH B. DICKEY.